(12) United States Patent
Schmidt et al.

(10) Patent No.: US 8,107,827 B2
(45) Date of Patent: Jan. 31, 2012

(54) METHOD AND APPARATUS FOR RECEPTION OF OPTICAL SIGNALS

(75) Inventors: Brendon James Schmidt, Victoria (AU); Arthur James Lowery, Victoria (AU); Jean Armstrong, North Balwyn (AU)

(73) Assignee: Ofidium Pty, Ltd., Melbourne (AU)

( * ) Notice: Subject to any disclaimer, the term of this patent is extended or adjusted under 35 U.S.C. 154(b) by 314 days.

(21) Appl. No.: 12/518,365

(22) PCT Filed: Feb. 20, 2009

(86) PCT No.: PCT/AU2009/000190
§ 371 (c)(1),
(2), (4) Date: Sep. 17, 2009

(87) PCT Pub. No.: WO2009/103118
PCT Pub. Date: Aug. 27, 2009

(65) Prior Publication Data
US 2010/0316393 A1    Dec. 16, 2010

(30) Foreign Application Priority Data
Feb. 22, 2008 (AU) .................... 2008900856

(51) Int. Cl.
*H04B 10/06* (2006.01)
*H04B 10/08* (2006.01)
(52) U.S. Cl. .......................... 398/205; 398/76
(58) Field of Classification Search .............. 398/205, 398/76
See application file for complete search history.

(56) References Cited

U.S. PATENT DOCUMENTS

| 5,235,340 | A | * | 8/1993 | Shea | 342/188 |
|---|---|---|---|---|---|
| 5,420,590 | A | * | 5/1995 | Shea | 342/188 |
| 6,959,154 | B1 | * | 10/2005 | Gnauck et al. | 398/159 |
| 7,376,360 | B2 | * | 5/2008 | Jennen | 398/205 |
| 7,447,436 | B2 | * | 11/2008 | Yee et al. | 398/95 |
| 7,672,598 | B1 | * | 3/2010 | Campillo | 398/184 |
| 2001/0030796 | A1 | * | 10/2001 | Yao | 359/334 |
| 2005/0238363 | A1 | * | 10/2005 | Jennen et al. | 398/152 |
| 2006/0274318 | A1 | * | 12/2006 | Jensen et al. | 356/477 |
| 2010/0316393 | A1 | * | 12/2010 | Schmidt et al. | 398/205 |

* cited by examiner

*Primary Examiner* — Danny Leung
(74) *Attorney, Agent, or Firm* — Woodcock Washburn LLP

(57) ABSTRACT

An apparatus and method are provided for receiving an optical signal having an optical carrier component and at least one information-bearing optical sideband. In general, an optical filter arrangement (110) is used to separate the optical carrier component from the information-bearing optical sideband. First and second optical splitters (126, 128) divide the optical power in the optical carrier and the optical sideband, respectively, into corresponding sub-components. The sub-components of the optical carrier have substantially orthogonal polarisation states, which is an optional characteristic of the sideband sub-components. First and second optical coupling devices (142, 144) respectively each combine one of the optical carrier sub-components with a corresponding one of the optical sideband sub-components. Optical detectors (158, 160) detect the outputs of the combiners (142, 144). The arrangement is able to achieve a number of the benefits of coherent optical heterodyne receivers, particularly when used in combination with advanced coding and modulation methods, while avoiding the need, and associated complexity, of providing an optical oscillator at the receiver.

14 Claims, 3 Drawing Sheets

METHOD AND APPARATUS FOR RECEPTION OF OPTICAL SIGNALS

CROSS REFERENCE TO RELATED APPLICATIONS

This application is the national phase of PCT Application No. PCT/AU2009/000190, filed Feb. 20, 2009, which claims priority to Australian Application No. 2008900856, filed Feb. 22, 2008.

FIELD OF THE INVENTION

The present invention relates generally to optical communications, and more particularly to improved apparatus and methods for receiving information signals that have been transmitted over optical channels, such as one or more spans of optical fibre.

BACKGROUND OF THE INVENTION

It is well known in the field of optical communications that coherent optical heterodyne receivers provide, in principle, the best available performance. Such receivers utilise a local optical oscillator, ie a suitable laser located at the receiver, having a frequency nominally equal (or almost equal) to that of the optical signal to be detected. The output field from the local laser is combined with the received signal field, and the combined signal directed to an optical-to-electrical converter, such as a photodiode. The process of so-called "square-law detection" (ie conversion of optical intensity into electrical current or voltage) causes mixing between the local oscillator field and the received signal field, whereby the optical signal is converted to an electrical signal within the radio frequency (RF) domain. The performance of this type of optical receiver is, in theory, limited only by the fundamental quantum noise fluctuations occurring within the local oscillator field. Consequently, continuous improvement in receiver noise performance may be obtained by increasing local oscillator power, up to the limits of the components utilised in the receiver.

Despite these excellent theoretical performance characteristics, coherent optical heterodyne receivers are rarely used in optical communications systems. This is in part due to the development of practical, high-gain, low-noise, optical amplifiers, which may be used to construct pre-amplified optical receivers having a noise figure that is, in principle, within 3 dB of the theoretical optimum noise performance of a coherent optical heterodyne receiver. Furthermore, in the presence of amplified spontaneous emission (ASE) noise generated in optical amplifiers used within optical communications links, receiver noise may no longer represent the ultimate limit to overall performance of the transmission systems. In these circumstances, the benefits available from the use of optical heterodyne receivers are substantially eroded. Most importantly, however, coherent optical heterodyne receivers are generally considered to have a number of practical disadvantages, particularly in terms of cost and complexity, which preclude their widespread deployment in optical communications systems.

Perhaps the main disadvantage of coherent optical heterodyne receivers is the requirement to provide a local optical oscillator having a narrow linewidth and a stable output frequency that remains locked to the frequency of the received optical signal. This generally requires that appropriate frequency control techniques be applied to the local oscillator laser. Furthermore, coherent optical detection is an inherently polarisation-sensitive process, since mixing only occurs at the photodetector between co-polarised components of the received signal and the local oscillator. Although it is possible, in principle and in practice, to align the polarisation states of the local oscillator and the incoming optical signal, additional complications arise in the case of very high bandwidth signals that have been transmitted over long, unregenerated optical links in which significant polarisation mode dispersion (PMD) may occur. In particular, PMD is a time- and frequency-dependent phenomenon, and it may therefore be difficult, or impossible, to align the polarisation state of all components of the received optical signal with that of the local oscillator.

For at least these reasons, most receivers deployed in optical communications systems are incoherent, or direct-detection receivers. The performance of such receivers is generally acceptable, and near optimum, for baseband optical transmission systems based upon intensity modulation (ie IM/DD systems). However, direct-detection receivers may not provide adequate performance in emerging applications employing alternative information coding and modulation formats. For example, a number of co-pending patent applications sharing common inventorship with the present application describe systems utilising orthogonal frequency division multiplexing (OFDM), and related techniques, for transmission of signals over optical channels. In such systems, the use of direct-detection may result in frequency-dependent attenuation, or fading, in the detected electrical spectrum, due to processes such as chromatic dispersion and PMD. In such cases, the use of a coherent optical heterodyne receiver may be beneficial, were it not for the associated cost and complexity.

It would therefore be desirable to provide an alternative apparatus for receiving an optical signal, and an associated method of reception, which is able to achieve at least some of the benefits of coherent optical heterodyne receivers, while avoiding the complexity associated with a local optical oscillator, and which therefore better meets the needs associated with emerging transmitter technologies, utilising coding and modulation methods other than traditional baseband intensity modulation.

The present invention seeks to address this need.

SUMMARY OF THE INVENTION

In one aspect the present invention provides an apparatus for receiving an optical signal which includes an optical carrier component and at least one information-bearing optical sideband in an optical frequency domain, the apparatus including:

an optical filter arrangement having an optical input and at least first and second optical outputs, the optical signal being coupled to the optical input, wherein optical power in substantially only the optical carrier component is transmitted to said first optical output, and optical power in substantially only the optical sideband is transmitted to said second optical output;

a first optical splitter, having an input coupled to said first optical output of the optical filter arrangement, which splits the optical power in the optical carrier component into two sub-components having first and second substantially orthogonal polarisation states, transmitted to corresponding first and second polarisation outputs;

a second optical splitter having an input coupled to said second optical output of the optical filter arrangement to split the optical power in the optical sideband into first and second sideband power sub-components, transmitted to corresponding first and second optical splitter outputs;

first and second optical coupling devices, each having at least two inputs and at least one output at which power from the two inputs is combined;

a first input of said first optical coupling device being coupled to the first polarisation output, and a second input of the first optical coupling device being coupled to the first output of said second optical splitter;

a first input of said second optical coupling device being coupled to the second polarisation output, and a second input of the second optical covering device being coupled to the second output of said second optical splitter; and at least first and second optical detectors coupled to corresponding ones of each said output of the first and second coupling devices, to generate received electrical signals corresponding with the detected optical signals.

Preferably, the first optical splitter includes a polarising beam splitter (PBS). Alternatively, the first optical splitter may include a power splitter having an optical input and two optical outputs, and wherein at least one polarisation rotator is coupled to at least one of said optical outputs and configured such that the two outputs of the first optical splitter have substantially orthogonal polarisation states. Other arrangements may also be employed, as may be known to persons skilled in the art, as long as the essential property of the two outputs having substantially orthogonal polarisation states is achieved.

Advantageously, receiving apparatus embodying the present invention are able to provide a number of benefits when employed in optical transmission systems. For example, in some embodiments the invention enables at least some of the advantages of coherent optical detection to be achieved without the need for a local optical oscillator to be provided at the receiving end of the system. Balanced receivers may be utilised to reduce the impact of optical noise in the corresponding received electrical signals. A state of polarisation of the received optical carrier may be controlled independently from the polarisation state of the information-bearing optical sideband, in order to mitigate effects of polarisation mode dispersion (PMD) which may affect different information-bearing spectral components to a varying degree, over both frequency and time. These and other benefits may be achieved using readily available components, and without the need for sophisticated optical and/or electronic control systems within the receiver.

In one preferred embodiment, the receiving apparatus includes a polarisation controller disposed between the first optical output of the optical filter arrangement, and the input of the PBS, the polarisation controller being configured to align a polarisation state of the optical carrier component transmitted therethrough relative to an axis of the PBS, such that the power transmitted to said first and second PBS outputs is substantially equal.

Such embodiments are particularly advantageous in systems exhibiting substantial PMD. In such systems, the polarisation state of the received optical carrier component may vary with time, relative to various spectral components of the optical sideband, such that a corresponding variation occurs in the average received electrical power detected at each of the first and second optical detectors. The application of polarisation control is therefore able to substantially mitigate this variation. The receiving apparatus may include a feedback controller, which utilises a comparison of average detected power at each detector as a means for adjusting the polarisation controller. Suitable dynamic polarisation controllers, operable via electrical inputs, are readily available commercially. Since the rate of change of polarisation state of the received optical carrier component is relatively slow, a suitable feedback controller is readily implemented using low-cost electronic components.

In an alternative preferred embodiment the second optical splitter is configured to split the optical power in the optical sideband into first and second sideband power sub-components having substantially orthogonal states of polarisation. For example, the second optical splitter may include a PBS.

The first and second optical coupling devices in such embodiments may be optical couplers having two outputs, at each of which power from the two inputs is combined. The optical detectors are preferably balanced optical receivers including two optical detection devices, each of which is coupled to one of said two outputs of the corresponding optical coupling device.

Advantageously, such embodiments exhibit characteristics similar to those of balanced coherent optical heterodyne receivers, but without the need to provide a local optical oscillator. Embodiments of the present invention are thereby able to provide many of the advantages of complex coherent optical receiving apparatus, in a substantially simplified configuration.

In some embodiments, an optical amplifier may be disposed between the first optical output of the optical filter arrangement, and the input of the first optical splitter, to amplify the power of the optical carrier component transmitted therethrough. Advantageously, amplifying the optical carrier power in this manner increases the ultimate received electrical signal power, and may also improve the received electrical signal-to-noise ratio (SNR).

Additionally, a filter may be provided following the optical amplifier in order to substantially reduce out-of-band amplified spontaneous emission (ASE) noise, so as to provide further improvements in receiver noise performance.

In some embodiments, the optical signal may include two information-bearing optical sidebands. The two sidebands may include complementary components of a single information-bearing signal, or may include different information-bearing signals. Each optical sideband may be directed, by the optical filter arrangement, to a single output thereof, or to different outputs thereof. For example, an optical filter arrangement may be provided having an optical input and first, second and third optical outputs, wherein optical power in substantially only a first optical sideband is transmitted to the second optical output, and optical power in substantially only the second optical sideband is transmitted to the third optical output. The two separate optical sideband components may subsequently be recombined with the carrier component, and directed to separate optical detectors.

Preferably, the optical signal includes a guard band in the optical frequency domain, the guard band including a spectral range between the optical carrier and the information-bearing sideband containing no substantial information-bearing signal components. Advantageously, the inclusion of a guard band facilitates operation of the optical filter arrangement, by providing for a transition band between the optical carrier component and the optical sideband component, accounting for realistic optical filter cut-off characteristics.

In another aspect, the invention provides a method for receiving an optical signal which includes an optical carrier component and at least one information-bearing optical sideband in an optical frequency domain, the method including the steps of:

separating the optical signal into substantially its optical carrier component and its information-bearing optical sideband component;

dividing the optical carrier component into at least two sub-components, having first and second substantially orthogonal polarisation states;

dividing the optical sideband component into at least two sub-components, each including a proportion of the total optical sideband power;

combining at least a part of a first one of said two optical carrier sub-components with at least a part of a first one of said two optical sideband sub-components, to form a first combined optical signal;

combining at least a part of a second one of said two optical carrier sub-components with at least a part of a second one of said two optical sideband sub-components, to form a second combined optical signal; and detecting said first and second combined optical signals to generate corresponding first and second received electrical signals.

The method may further include controlling a polarisation state of the separated optical carrier component, such that said two sub-components having first and second substantially orthogonal polarisation states also have substantially equal optical power.

The step of dividing the optical sideband component into at least two sub-components may include dividing the optical sideband component into at least two sub-components having first and second substantially orthogonal polarisation states.

Further preferred features and advantages of the invention will be apparent to those skilled in the art from the following description of preferred embodiments of the invention, which should not be considered to be limiting of the scope of the invention as defined in the preceding statements, or in the claims appended hereto.

BRIEF DESCRIPTION OF THE DRAWINGS

Preferred embodiments of the invention are described with reference to the accompanying drawings, in which.

DETAILED DESCRIPTION OF PREFERRED EMBODIMENTS

Figure 1:
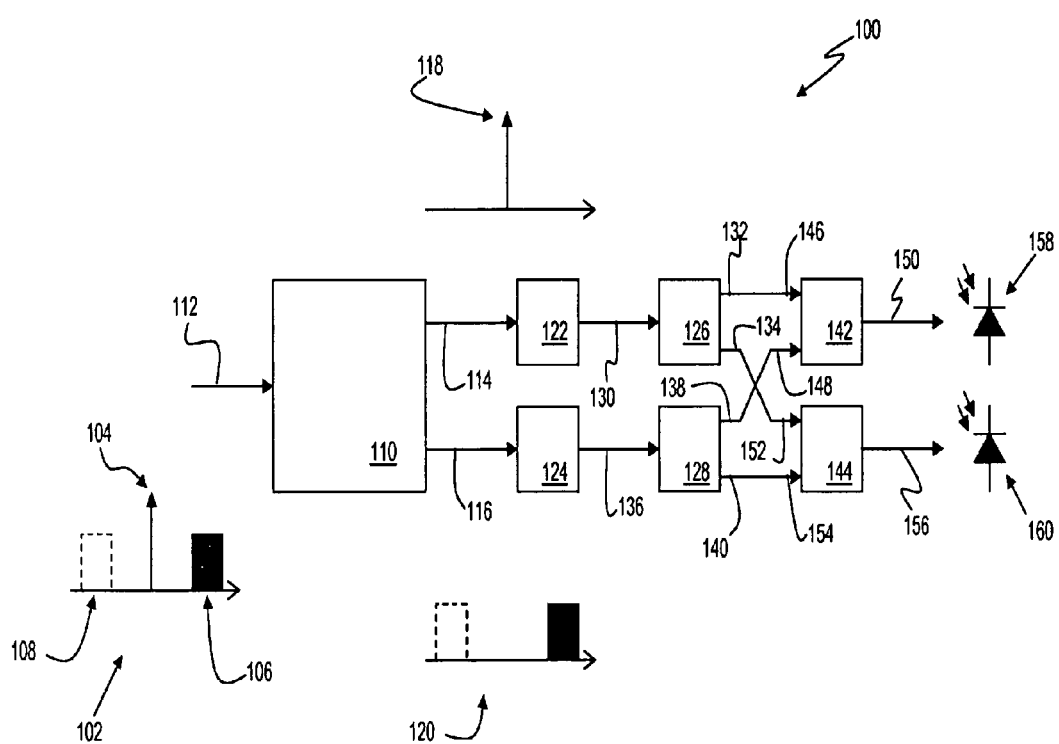
FIG. 1 is a block diagram illustrating a generic embodiment of the present invention.

FIG. 1 is a block diagram illustrating a generic embodiment of a receiving apparatus 100, in accordance with the present invention. A received optical signal, represented by the optical spectrum 102, includes a carrier component 104, and at least one information-bearing optical sideband 106. Optionally, the optical signal 102 may include a second information-bearing optical sideband 108 in the optical frequency domain.

An optical filter arrangement 110 is provided which has an optical input 112, at which the optical signal 102 is received. The filter arrangement 110 further includes at least first optical output 114 and second optical output 116. The filter arrangement 110 is configured such that output power in substantially only the optical carrier component 118 is transmitted to output 114, and output power in substantially only the optical sideband 120 is transmitted to the output 116. It will be appreciated that, in practice, optical components utilised in the filter arrangement 110 are imperfect, and accordingly that some leakage of carrier and sideband power will occur such that a small proportion of carrier power may be present at output 166, and/or a small proportion of sideband power may be present at output 114. In this context, the term "substantially" will be understood to mean that the level of leakage is as low as is reasonably possible using readily available components, and moreover has no significant impact upon the operation and performance of the receiver 100 as herein described.

Various available components suitable for implementing the optical filter arrangement 110 will be well known to persons skilled in the art of optical communications. For example, the optical filter arrangement may include optical fibre couplers, planar couplers, arrayed waveguide devices, fibre grating devices, circulators, thin-film filters, and so forth, all of which are available commercially in packaged form suitable for deployment within optical communications systems.

Optionally, additional components 122, 124 may be provided for performing further manipulation and/or processing of the optical carrier component 118 and/or the optical sideband component 120. Such additional components 122, 124 may include optical amplifiers, further optical filtering devices or elements, polarisation controllers and so forth. Examples of additional manipulation/processing having particular advantages are described in greater detail below in relation to the preferred embodiments 200, 300 depicted in FIGS. 2 and 3.

A first optical splitter 126, has an input 130 coupled to the first optical output 114 of the optical filter arrangement 110. The splitter 126 splits the input optical carrier component into two sub-components having substantially orthogonal polarisation states, transmitted to corresponding first polarisation output 132 and second polarisation output 134.

In presently preferred embodiments, such as the receiver arrangements 200, 300 described below with reference to FIGS. 2 and 3, the first optical splitter 126 is a PBS. However, other components may be utilised in order to achieve the desired property of splitter 126, being that the two outputs 132, 134 have substantially orthogonal polarisation states. For example, in one envisaged alternative the splitter 126 includes an optical power splitter with a polarisation rotator coupled to at least one output port thereof, configured such that the two outputs of the splitter 126 have orthogonal polarisation states. Suitable polarisation rotation devices include magneto-optic devices based upon the Faraday effect, half-wave plates, and liquid-crystal devices. The use of a polarisation controller at the input 130 of splitter 126 (ie as component 122) may be beneficial in order to align the input polarisation state with a preferred input state of the rotator.

A second optical splitter 128 has an input 136 coupled to the second optical output 116 of the optical filtering arrangement 110. Optical power input to the optical splitter 128 is divided into first and second sideband power sub-components, transmitted to corresponding first optical splitter output 138 and second optical splitter output 140. The optical splitter 128 may be a wavelength-independent power divider, such as a biconical tapered fibre device, a PBS, or any other suitable optical splitting component or combination thereof.

First and second optical coupling devices 142, 144, each having at least two inputs and at least one output, are provided. The first optical coupling device 142 has a first input 146 coupled to the first output 132 of the splitter 126. A second input 148 is coupled to the first output 138 of the optical splitter 128. Power at the first and second inputs 146, 148 is combined and coupled to the output 150.

Second optical coupling device 144 has first input 152 coupled to the second output 134 of the splitter 126. Second input 154 is coupled to the second output 140 of the optical splitter 128. Power at the two inputs 152, 154 is combined at the output 156.

It will again be appreciated that the first and second optical coupling devices 142, 144 may be implemented using various commercially available components, and may be, for example, power combiners based upon biconical tapered coupler or planar waveguide technology.

Two optical detectors 158, 160 are coupled to the two corresponding outputs 150, 156. The detectors 158, 160 may be PIN photodiodes, generating electrical current which is proportional to the instantaneous optical input intensity.

At each of the optical detectors 158, 160 a proportion of power in the optical carrier component 118 having a predetermined polarisation state, selected by the PBS 126, mixes with a proportion of power coupled from the information-bearing optical sideband component 120. The process thereby occurring at each optical detector 158, 160 is analogous to that which occurs at a photodetector in a coherent optical heterodyne receiver. Accordingly, with appropriate selection and configuration of various components within the receiver apparatus 100, benefits of coherent optical heterodyne detection may be achieved without the use of an optical local oscillator.

The receiver apparatus 100 may be configured differently, in order to provide specific embodiments of the invention that are particularly advantageous in selected optical system applications. Two such embodiments 200, 300 are described below in greater detail, with reference to FIGS. 2 and 3.

Figure 2:
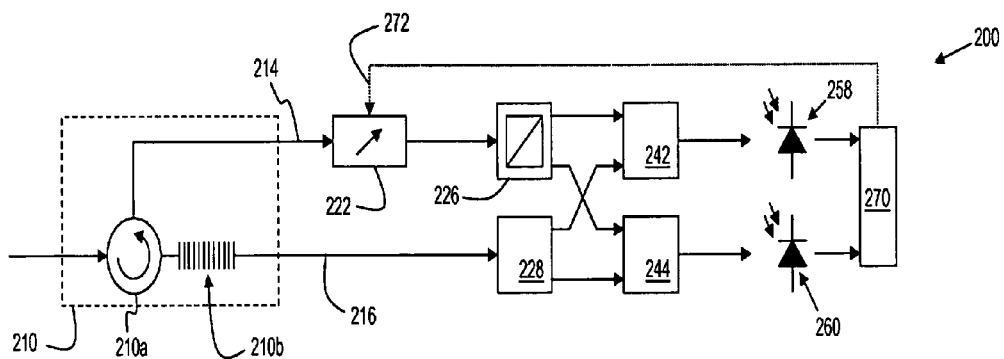
FIG. 2 is a block diagram illustrating a first preferred embodiment of the present invention.

FIG. 2 is a block diagram illustrating a first preferred embodiment of a receiver apparatus 200. By way of example, the optical filter arrangement 210 includes a circulator 210a and a reflective fibre grating device 210b. The fibre grating device 210b is selected to reflect light at the frequency of the optical carrier component 104, while allowing light at other frequencies, such as sidebands 106, 108, to pass through. Carrier power is therefore reflected back to the circulator 210a, and emerges at the output port 214. Sideband power passes through the fibre grating 210b and emerges at the output port 216.

A polarisation controller 222 is disposed between the output 214 of the filter arrangement 210, and the input of PBS 226. As will be described in greater detail below, the polarisation controller 222 is configured and operated so as to align the polarisation state of the carrier power passing therethrough relative to an axis of the PBS 226, such that approximately equal power from the optical carrier component is transferred to each of the two outputs of the PBS 226.

Optical sideband power transmitted from output 216 enters power splitter 228, and is divided between the two outputs thereof.

The proportion of optical sideband power transmitted to the first output of the splitter 228 is combined with carrier power having a first polarisation state transmitted from PBS 226, at coupler 242. Similarly, optical sideband power transmitted to the second output of the power splitter 228 is combined with optical carrier power having a second, orthogonal, polarisation state at the coupler 244.

Outputs of the couplers 242, 244 are transmitted to detectors 258, 260.

The receiver arrangement 200 has particular utility in systems exhibiting substantial PMD. In such systems, the polarisation state of the carrier 104 and sideband 106, 108 components of an optical signal 102 may vary with frequency and time. Polarisation controller 222 allows the polarisation state of the received optical carrier to be controlled, and maintained, while frequency dependence of the polarisation within the optical carrier component 118 is of no concern, due to its relatively narrow linewidth.

The broader bandwidth optical sidebands 106, 108, on the other hand, may exhibit time-varying frequency-dependent changes in polarisation state, due to PMD. This would result, in a conventional direct detection receiver, in time- and frequency-dependent variation, or fading, in components of the radio frequency (RF) signal within the electrical domain. In accordance with the arrangement 200, however, the total RF signal power received by the two detectors 258, 260 is independent of the polarisation state of any given frequency component of the information-bearing sidebands 106, 108. This is due to the fact that each of the two detectors effectively performs a coherent-type detection process utilising an optical carrier component having one of two distinct, orthogonal, polarisation states.

An automated mechanism for operating the polarisation controller 222 is also illustrated in the receiver apparatus 200. In particular, an electronic controller 270 is provided which monitors the electrical outputs of the two detectors 258, 260, and operates the polarisation controller 222 via control input 272. As a practical matter, assuming that the carrier power incident upon each detector is significantly greater than the corresponding total sideband power (which may be achieved using optical amplification, if required), then the average photocurrent (ie DC component) generated at each detector is proportional to the received optical carrier power. Accordingly, any difference between the two average received photocurrent values is generally indicative of unequal power output from the two output ports of the PBS 226. Thus, when the controller 270 detects a difference in average photocurrent, it generates a control signal applied to input 272, in order to adjust the polarisation state of the optical carrier component, until equal power splitting is once again achieved through PBS 226. As will be appreciated, an electronic controller of this type would be straightforward to implement, and requires operation only at low frequencies.

Figure 3:
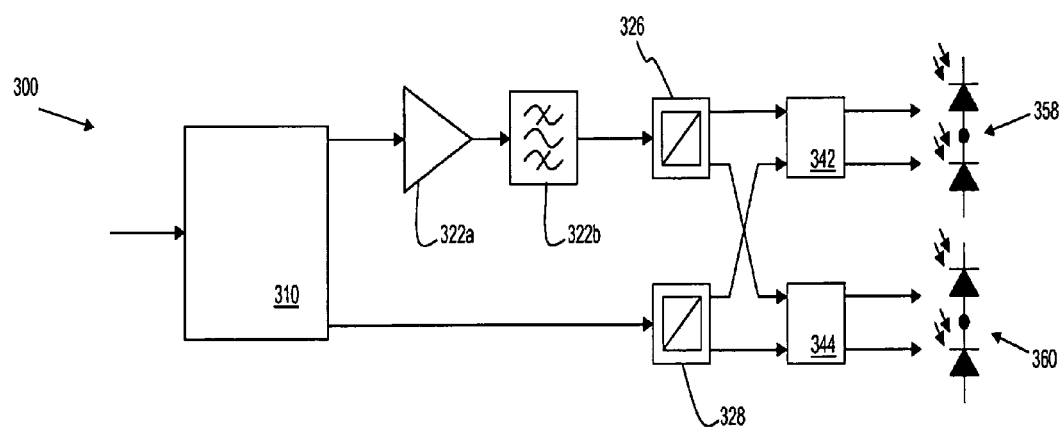
FIG. 3 is a block diagram illustrating a second preferred embodiment of the present invention.

FIG. 3 is a block diagram illustrating a further preferred embodiment of a receiver apparatus 300 according to the present invention. An optical filter arrangement 310 has two outputs, transmitting an optical carrier component and an information-bearing optical sideband component respectively. As in the arrangement 100, details of the optical filter arrangement 310 are omitted, however a variety of suitable components and configurations will be readily apparent to persons skilled in the art of optical communications, such as the arrangement 210 detailed in FIG. 2.

In accordance with the apparatus 300, an optical amplifier 322a amplifies the optical carrier component 118, and a bandpass filter 322b is provided in order to eliminate excess, out-of-band, ASE noise generated by the amplifier 322a. A PBS 326 splits the optical power in the optical carrier component into two sub-components having substantially orthogonal polarisation states.

The second optical splitter consists of an additional PBS 328. That is, in accordance with the arrangement 300, the received optical sideband component is also divided into two sub-components having substantially orthogonal polarisation states. The outputs of the two PBS 326, 328 having the same state of polarisation are input, respectively, to two optical couplers 342, 344. The couplers 342, 344 may be, for example, planar waveguide couplers, or biconical tapered fibre couplers.

As is known in the art, it is a property of such coupling devices that optical fields coupled across the device experience a 90 degree phase shift relative to fields transmitted straight through the device. Accordingly, the phase of the optical sideband components, relative to the accompanying optical carrier components, at each of the two outputs of each coupler 342, 344 differ by 180 degrees. By detecting both of these outputs using balanced receivers 358, 360, desired signal components combine in-phase in the electrical domain, whereas random noise components resulting from beating between optical noise components (such as ASE) in the detected optical signal combine out-of-phase. Accordingly, the arrangement of couplers 342, 344 and balanced receivers 358, 360 results in the substantial rejection of ASE×ASE beat noise in the electrical domain, as well as reducing interference caused by mixing of sideband components with each other and with ASE noise. The dominant noise component, originating in the optical domain, is therefore beat noise generated between the optical carrier component 118 and ASE noise. An overall reduction in optically-originating noise within the detected electrical signal is thereby achieved.

Figure 4:
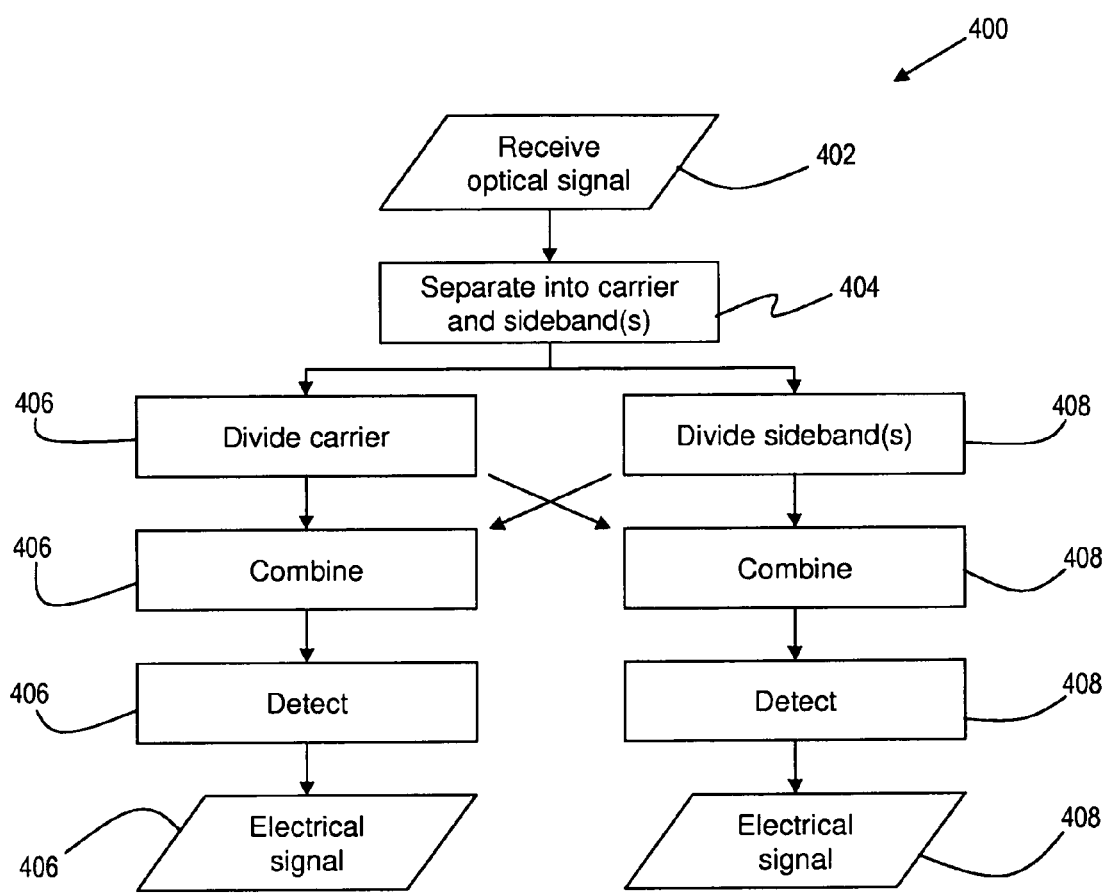
FIG. 4 is a flowchart illustrating a preferred method for receiving an optical signal according to the invention.

FIG. 4 is a flowchart 400 which illustrates a preferred method for receiving an optical signal according to embodiments of the invention, such as those 100, 200, 300 described above with reference to FIGS. 1 to 3. In accordance with this method 400, an input optical signal is received 402, which includes an optical carrier component and at least one information-bearing optical sideband. The received signal is separated 404 into substantially its optical carrier component and its information-bearing optical sideband component. At step 406 the carrier component is divided into at least two sub-components, having first and second substantially orthogonal polarisation states, while at step 408 the optical sideband component is divided into at least two sub-components, each including a proportion of the total optical sideband power.

At step 410 a first combined optical signal is formed by combining at least a part of a first one of the two optical carrier components generated at step 406, with at least a part of a first one of the two optical sideband sub-components generated at step 408. Similarly, at step 412, a second combined optical signal is formed by combining at least a part of a second one of the two optical carrier sub-components generated at step 406 with at least a part of a second one of the two optical sideband sub-components generated at step 408.

At step 414, the first combined optical signal formed at step 410 is detected to generate a first received electrical signal 418. Similarly, at step 416, the second combined optical signal formed at step 412 is detected to generate a second received electrical signal 420.

As will be appreciated from the description of the embodiments 100, 200, 300 set out above with reference to FIGS. 1 to 3, various further refinements of the method 400 are possible. For example, between steps 404 and 406 a further step of controlling the polarisation state of the separated optical carrier component may be performed, such that the two sub-components resulting from step 406 have substantially equal optical power. Additionally, or alternatively, the step 408 of dividing the optical sideband component into at least two sub-components may be performed in such a way (for example utilising a PBS) that the two sub-components have substantially orthogonal polarisation states.

While particular embodiments of the present invention have been described herein, by way of example, it will be understood that the invention is not so limited, but rather that the scope of the invention is defined by the claims appended hereto. For example, features described in relation to each one of the two particular embodiments 200, 300 may be combined to provide further advantageous arrangements. As one example, the amplifier 322a and filter 322b may be employed to provide amplification of the optical carrier component within the embodiment 200. Similarly, a polarisation controller 222 might be utilised in combination with the arrangement 300, in order to maintain approximately constant carrier component power at each balanced detector 358, 360, in the presence of PMD and/or polarisation drift. Various other alternatives and combinations also fall within the scope of the invention as broadly defined.

The invention claimed is:

1. An apparatus for receiving an optical signal which includes an optical carrier component and at least one information-bearing optical sideband in an optical frequency domain, the apparatus including:
an optical filter arrangement having an optical input and at least first and second optical outputs, the optical signal being coupled to the optical input, wherein optical power in substantially only the optical carrier component is transmitted to said first optical output, and optical power in substantially only the optical sideband is transmitted to said second optical output;
a first optical splitter, having an input coupled to said first optical output of the optical filter arrangement, which splits the optical power in the optical carrier component into two sub-components having first and second substantially orthogonal polarisation states, transmitted to corresponding first and second polarisation outputs;
a second optical splitter having an input coupled to said second optical output of the optical filter arrangement to split the optical power in the optical sideband into first and second sideband power sub-components, transmitted to corresponding first and second optical splitter outputs;
first and second optical coupling devices, each having at least two inputs and at least one output at which power from the two inputs is combined;
a first input of said first optical coupling device being coupled to the first polarisation output, and a second input of the first optical coupling device being coupled to the first output of said second optical splitter;
a first input of said second optical coupling device being coupled to the second polarisation output, and a second input of the second optical covering device being coupled to the second output of said second optical splitter; and
at least first and second optical detectors coupled to corresponding ones of each said output of the first and second coupling devices, to generate received electrical signals corresponding with the detected optical signals.

2. The apparatus of claim 1, wherein the first optical splitter includes a polarising beam splitter (PBS).

3. The apparatus of claim 1, wherein the first optical splitter includes a power splitter having an optical input and two optical outputs, and wherein at least one polarisation rotator is coupled to at least one of said optical outputs and configured such that the two outputs of the first optical splitter have substantially orthogonal polarisation states.

4. The apparatus of claim 2, further including a polarisation controller disposed between the first optical output of the optical filter arrangement, and the input of the PBS, the polarisation controller being configured to align a polarisation state of the optical carrier component transmitted therethrough relative to an axis of the PBS, such that the power transmitted to said first and second PBS outputs is substantially equal.

5. The apparatus of claim 4 which includes a feedback controller, which utilises a comparison of average detected power at each detector as a means for adjusting the polarisation controller.

6. The apparatus of claim 1, wherein the second optical splitter is configured to split the optical power in the optical sideband into first and second sideband power sub-components having substantially orthogonal states of polarisation.

7. The apparatus of claim 6 wherein the second optical splitter includes a PBS.

8. The apparatus of claim 6 wherein the first and second optical coupling devices are optical couplers having two outputs, at each of which power from the two inputs is combined.

9. The apparatus of claim 8 wherein the optical detectors are balanced optical receivers including two optical detection devices, each of which is coupled to one of said two outputs of the corresponding optical coupling device.

10. The apparatus of claim 1, wherein an optical amplifier is disposed between the first optical output of the optical filter arrangement, and the input of the first optical splitter, to amplify the power of the optical carrier component transmitted therethrough.

11. The apparatus of claim 1, wherein the optical signal includes a guard band in the optical frequency domain, the guard band including a spectral range between the optical carrier and the information-bearing sideband containing no substantial information bearing signal components.

12. A method for receiving an optical signal which includes an optical carrier component and at least one information bearing optical sideband in an optical frequency domain, the method including the steps of:

separating the optical signal into substantially its optical carrier component and its information-bearing optical sideband component;

dividing the optical carrier component into at least two sub-components, having first and second substantially orthogonal polarisation states;

dividing the optical sideband component into at least two sub-components, each including a proportion of the total optical sideband power;

combining at least a part of a first one of said two optical carrier sub components with at least a part of a first one of said two optical sideband sub components, to form a first combined optical signal;

combining at least a part of a second one of said two optical carrier sub components with at least a part of a second one of said two optical sideband sub components, to form a second combined optical signal; and detecting said first and second combined optical signals to generate corresponding first and second received electrical signals.

13. The method of claim 12 further including the step of controlling a polarisation state of the separated optical carrier component, such that said two sub components having first and second substantially orthogonal polarisation states also have substantially equal optical power.

14. The method of claim 12 wherein the step of dividing the optical sideband component into at least two sub components includes dividing the optical sideband component into at least two sub components having first and second substantially orthogonal polarisation states.

* * * * *